United States Patent [19]

Bader et al.

[11] Patent Number: 5,422,422

[45] Date of Patent: Jun. 6, 1995

[54] HIGH REFRACTIVE INDEX PLASTIC BASE ON AN ALKYLTHIOL AND AN ALKYLPOLYTHIOL ESTER

[75] Inventors: Martina Bader, Griesheim; Volker Kerscher, Reinheim, both of Germany

[73] Assignee: Roehm GmbH Chemische Fabrik Patentabteilung, Darmstadt, Germany

[21] Appl. No.: 134,736

[22] Filed: Oct. 12, 1993

[30] Foreign Application Priority Data

Oct. 10, 1992 [DE] Germany ............... 42 34 256.2

[51] Int. Cl.$^6$ ............... C08G 75/04; C08F 228/00
[52] U.S. Cl. ............... 528/376; 351/159; 526/289
[58] Field of Search ............... 526/286, 289; 528/376

[56] References Cited

U.S. PATENT DOCUMENTS 5,270,439 12/1993 Maruyama ............... 528/373
5,294,690 3/1994 Iguchi ............... 526/286

FOREIGN PATENT DOCUMENTS 0273661 7/1988 European Pat. Off. .
0394495 10/1990 European Pat. Off. .
3163120 7/1991 Japan .
4198205 7/1992 Japan .

*Primary Examiner*—Christopher Henderson
*Attorney, Agent, or Firm*—Oblon, Spivak, McClelland, Maier, & Neustadt

[57] ABSTRACT

The invention relates to a high refractive index plastic produced by reaction of an alkylthiol with a multiply unsaturated monomer, wherein said alkylthiol (A) has at least 2, and up to 20 carbon atoms in the alkyl group, and contains at least 2 thiol groups in the molecule, is reacted with an alkylpolythiol ester (B) having at least 2, and up to 24, preferably up to 12, carbon atoms in the alkyl group, which ester contains at least 2 thiol groups esterified with (meth)acrylic acid in the molecule, said reaction being under conditions of radical polymerization, with the limitation that the numerical ratio of the mercapto groups to the available double bonds is $\leq 1$, preferably $<0.5$.

7 Claims, No Drawings

HIGH REFRACTIVE INDEX PLASTIC BASE ON AN ALKYLTHIOL AND AN ALKYLPOLYTHIOL ESTER

BACKGROUND OF THE INVENTION

1. Field of the Invention

The invention relates to a high refractive index plastic, produced by reacting an alkylpolythiol with an alkylpolythiol ester of (meth)acrylic acid, under the conditions of radical polymerization.

2. Discussion of the Background

A high refractive index is very advantageous for plastics which are to be used in optical elements.

A high refractive index of the material can be achieved, e.g., by incorporating sulfur atoms into the plastic. One means of introducing sulfur into a polymer chain, is by thiol addition to an organic isocyanate. Thus, in EP-A 235,743, 330,363 and 351,073 high refractive index polymers are proposed which are produced from polythiols and polyisocyanates, or from sulfur-containing polyisocyanates and polyisothiocyanates.

However, in general, the optical dispersion of such polyurethane derivatives is excessive. An exception is the case of polymers with halogen-containing aromatic dithiols. However, the halogen content presents drawbacks in processing and toxicity. Thiol-ene addition can also be used to produce optical materials, e.g. in the form of addition products of polythiols to multiply unsaturated compounds. An example of this is the use of dimethacrylates of dihydric alcohols (see, e.g., EP-A 437,374 and 284,374). However, the refractive index of such materials is insufficiently high. The polymers claimed in EP 394,495 have high indices of refraction (>1.65), but the aromatic diene (4,4,'-bis((meth)acryloylthio)diphenyl sulfide) causes a high dispersion of light.

The sulfur-containing polymers of the state of the art are not satisfactory for use in optical components, either as to their optical properties or their mechanical properties.

Accordingly, the underlying problem of the invention is to devise transparent, colorless plastics with a high refractive index and a high Abbe number.

It has been discovered, in connection with the present invention, that transparent, colorless polymers, with very good optical properties can be produced by reacting polythiols with multifunctional alkyl thio(meth)acrylates under conditions of simultaneous polymerization and polyaddition.

SUMMARY OF THE INVENTION

Accordingly, the invention relates to a high refractive index plastic K produced by reaction of an alkylthiol with a multiply unsaturated monomer, wherein said alkylthiol (A) has at least 2, and up to 20 carbon atoms in the alkyl group, and contains at least 2 thiol groups in the molecule, is reacted with an alkylpolythiol ester (B) having at least 2, and up to 24, preferably up to 12, carbon atoms in the alkyl group, which ester contains at least 2 thiol groups esterified with (meth)acrylic acid in the molecule, said reaction being under conditions of radical polymerization, with the limitation that the numerical ratio of the mercapto groups to the available double bonds is $\leq 1$, preferably $<0.5$.

DETAILED DESCRIPTION OF THE PREFERRED EMBODIMENTS

The structure of the alkylthiol (A) is preferably such that the density of sulfur atoms per unit volume is high. This can be achieved, e.g., by employing a branched or cyclic skeleton, e.g. neopentyl. For introducing the thiol groups, advantageously one may start with hydroxyl groups on the molecule, which are then, e.g., esterified with thioglycolic acid. In this way, e.g. pentaerythritol may be esterified with thioglycolic acid to form pentaerythritol tetrathioglycolate (compound A-I). Cyclic polyols such as, e.g., sugar alcohols may be esterified in a similar fashion.

The alkylpolythiol ester (B) is represented by the general formula I

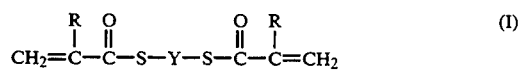

where R represents hydrogen or methyl; and
Y represents a $C_{2-24}$ alkyl group, preferably a $C_{2-12}$ alkyl group, a $C_{2-24}$ branched alkyl group, preferably a $C_{2-12}$ branched alkyl group, a $C_{3-24}$ cyclic alkyl group, preferably a $C_{3-12}$ cyclic alkyl group, said alkyl, branched alkyl or cyclic alkyl optionally containing ether or thioether groups, and optionally being substituted with additional

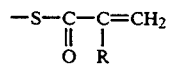

groups. Again, a high density of sulfur atoms in the molecule per unit volume is advantageous. Examples of subject compounds are ethanedithiol methacrylate bisester, and propanedithiol methacrylate bisester (hereinafter, "ethanedithiol dimethacrylate" and "propanedithiol dimethacrylate").

The starting compounds (A) and (B) may be produced by conventional methods which are known to those of ordinary skill in the art.

When compounds (A) and (B) are reacted under conditions of radical polymerization (see Rauch-Puntigam, H., and Voelker, Th., 1967, "Acryl- und Methacrylverbindungen", pub. Springer-Verlag, of Berlin, Heidelberg, and New York), both polymerization and polyaddition occur.

Suitable initiators are the known radical initiators, e.g. azo initiators such as azobis(isobutyronitrile) (AIBN), in the usual amounts, e.g. 0.1-1 wt. % (based on the weight of the monomers).

The polymerization may be carried out, e.g., in bulk (i.e. without solvent), wherein it may be between two glass plates, in the manner which is common with polymerization of methyl methacrylate in the mass. Solution polymerization (e.g.) is another possibility.

The plastic E is comprised of units of the components (A) and (B) and may also contain additives known from acrylate chemistry, such as stabilizers, parting compounds, and possibly colorants (see Gaechter, R., and Mueller, H., 1979, "Taschenbuch der Kunststoff-Additive" pub. Hanser-Verlag)

Advantageously, when conducting polymerization in bulk, a homogeneous mixture of components (A) and (B) and the initiator is prepared and charged into a space between two glass plates. Polymerization is initiated by an energy supply; e.g., by energetic radiation, particularly UV light, or by heating, advantageously in a water bath, wherewith the energy is supplied over an extended period, e.g. 24–30 hr. Advantageously the temperature is increased during the polymerization, e.g. over the range 40°–90° C. The resulting plastic K is a very clear, colorless, hard plate. The plastic K preferably has a refractive index of >1.589 and an Abbe number of >38.6.

The inventive plastic E is well suited for numerous applications, particularly in the optics area. E.g., prisms, lenses, eyeglass lenses, and other optical components may be produced from the plastic K.

Comparison with a homopolymer of (meth)acrylate esters (B) shows the inventive plastic K to be clearly superior in its mechanical properties. Copolymers of (A) with (meth)acrylate esters of (sulfur-free) polyols, which polyols are otherwise analogous to the compound (B), also have much inferior optical properties.

Having generally described this invention, a further understanding can be obtained by reference to certain specific examples which are provided herein for purposes of illustration only and are not intended to be limiting unless otherwise specified. An Abbe refractometer was used to determine the refractive index and Abbe number. The Abbe number can be obtained from the dispersion tables (see DIN 53 491; and 1978, "Ullmanns Encyclopaedie der technischen Chemie", 4th Ed Vol. 15 pub Verlag Chemie, p. 368).

EXAMPLES

Example 1

Polymer from ethanedithiol dimethacrylate and pentaerythritol tetrathioglycolate in a molar ratio of 1:0.25:

A solution of 23 g ethanedithiol dimethacrylate, 10.8 g pentaerythritol tetrathioglycolate, and 135 mg azobis(isobutyronitrile) was charged between two glass plates (c. 90×120 ×3 mm) and was polymerized for 28 hr in a water bath under a temperature schedule of 40°–90=C. The resulting plastic plate was hard, clear, and colorless, with refractive index of 1.5989 and Abbe number 38.9.

For a molar ratio of component (B) to component (A) of 1:0,125, a product with a refractive index of 1.6024 was obtained.

Example 2

(Comparison Example)

Polymer of ethylene glycol dimethacrylate and pentaerythritol tetrathioglycolate A monomer mixture of 23.8 g ethylene glycol dimethacrylate, 13.0 g pentaerythritol tetrathioglycolate, and 148 mg azobis(isobutyronitrile) was polymerized as in Example 1. The polymer obtained was also clear and hard, and had a refractive index of 1.5356 and Abbe number 51.

Example 3

(Comparison Example)

Homopolymer of ethanedithiol dimethacrylate:

The homopolymer was produced by a procedure analogous to that of Examples 1 and 2. A clear but very brittle material was obtained, with a refractive index of 1.6075 and Abbe number 35.

Example 4

Polymer from propanedithiol dimethacrylate, 1,9-bis(methacryloylthio)-3,7-dithiononane, and pentaerythritol tetrathioglycolate, in a molar ratio of 2:1:0.75

A solution of 16.3 g propanedithiol dimethacrylate, 12.1 g 1,9-bis(methacryloylthio)-3,7-dithianonane, 10.8 g pentaerythritol tetrathioglycolate, and 157 mg azobis(isobutyronitrile) was charged between two glass plates (c. 90×120×3 mm) and was polymerized for 28 hr, in a water bath under a temperature schedule of 40°–90° C. The resulting plastic plate was hard, clear, and colorless, with a refractive index and Abbe number as given in the Table, infra, and impact strength 16.1 kJ/m$^2$ (determined according to ISO 179).

Example 5

Polymer from propanedithiol dimethacrylate and pentaerythritol tetrathioglycolate, in a molar ratio of 1:0.125

The same procedure as in Example 4 was followed, but with the use of 30.4 g propanedithiol dimethacrylate, 6.75 g pentaerythritol tetrathioglycolate, and 148 mg azobis(isobutyronitrile). A hard, clear, colorless plate was produced, having a refractive index and Abbe number as given in the Table, infra.

Example 6

Polymer from ethanedithiol dimethacrylate, 1,5-bis(methacryloylthio)-3-thiopentane, and pentaerythritol tetrathioglycolate, in a molar ratio of 1:1:0.25

The same procedure as in Example 4 was followed, but with the use of 17.4 g 2,5-bis(methacryloylthio)-3-thiapentane, 13.8 g ethanedithiol dimethacrylate, 6.45 g pentaerythritol tetrathioglycolate, and 148 mg azobis(isobutyronitrile). A hard, clear, colorless plate was produced, having a refractive index and Abbe number as given in the Table, infra.

Example 7

Polymer from propanedithiol dimethacrylate and glycerin trithioglycolate, in a molar ratio of 1:0,166

The same procedure as in Example 4 was followed, but with the use of 34.8 g propanedithiol dimethacrylate, 7.4 g glycerin trithioglycolate, and 169 mg azobis(isobutyronitrile). A hard, clear, colorless plate was produced, having a refractive index and Abbe number as given in the Table, infra.

Example 8

Polymer from propanedithiol dimethacrylate and pentaerythritol tetrakismercaptopropanoate, in a molar ratio of 1:0.125

The same procedure as in Example 4 was followed, but with the use of 36.5 g 1,3-propanedithiol dimethacrylate, 9.1 g pentaerythritol tetrakismercaptopropanoate, and 185 mg azobis(isobutyronitrile). A hard, clear, colorless plate was produced, having a refractive index and Abbe number as given in the Table, infra.

TABLE

| | Characteristics of the polymers: | | | | |
|---|---|---|---|---|---|
| | Alkylpolythio 1 ester (B) | Alkylthiol (A) | Molar ratio | Refractive index, $n_{20}$ D | Abbe number |
| Example | | | | | |
| 1 | EDDM | PETTG | 1:0.25 | 1.5989 | 38.6 |
| 1 | EDDM | PETTG | 1:0.125 | 1.6024 | — |
| 4 | PDDM, BMTDTN | PETTG | 2:1:0.75 | 1.5978 | 39.3 |
| 5 | PDDM | PETTG | 1:0.125 | 1.5946 | 41 |
| 6 | EDDM, BMTTP | PETTG | 1:1:0.25 | 1.6084 | 37.8 |
| 7 | PDDM | GTTG | 1:0.166 | 1.5953 | 40 |
| 8 | PDDM | PETMP | 1:0.125 | 1.5893 | 40 |
| Comparison Examples: | | | | | |
| 2 | EDDM | N/A | N/A | 1.6057 | 35 |
| 3 | EGDM | PETTG | 1:0.25 | 1.5356 | (material brittle). 51 |

KEY to Table:
EDDM   ethanedithiol dimethacrylate.
PETTG  pentaerythritol tetrathioglycolate.
BMTDTN bis(methacryloylthio)dithiononane.
PDDM   propanedithiol dimethacrylate.
GTTG   glycerin trithioglycolate.
PETMP  pentaerythritol tetrakismercaptopropanoate.
EGDM   ethylene glycol dimethacrylate
BMTTP  bis(methacryloythio)thiopentane.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A high refractive index plastic comprising the reaction product of:
   (A) a $C_{2-20}$ alkylthiol which contains at least 2 thiol groups in the molecule; and
   (B) an alkylpolythiol ester of formula I

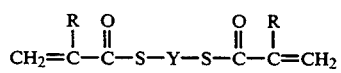
$$CH_2=C-C-S-Y-S-C-C=CH_2 \quad (I)$$
with R above each C=C carbon and O above each carbonyl where
   R represents hydrogen or methyl; and
   Y represents a $C_{2-24}$ alkyl group, a $C_{2-24}$ branched alkyl group or a $C_{3-24}$ cyclic alkyl group;
said reaction being under conditions of radical-initiated polymerization, with the limitation that the numerical ratio of the mercapto groups in said alkylthiol to the double bonds in said alkylpolythiol ester is $\leq 1$,
wherein said high refractive index plastic has a refractive index of $>1.589$ and an Abbe number of $>38.6$.

2. The high refractive index plastic of claim 1; wherein said alkylthiol is pentaerythritol tetrathioglycolate.

3. The high refractive index plastic of claims 1 or 2; wherein said alkylpolythiol ester is ethanedithiol dimethacrylate.

4. The high refractive index plastic of claims 1 or 2; wherein said alkylpolythiol ester is propanedithiol methacrylate.

5. The high refractive index plastic of claim 1, wherein said $C_{2-24}$ alkylpolythiol ester is a $C_{2-12}$ alkylpolythiol ester.

6. The high refractive index plastic of claim 1, wherein said numerical ratio is $<0.5$.

7. The high refractive index plastic of claim 1, wherein said alkylthiol is the reaction product of a hydroxy containing compound with thioglycolic acid.

* * * * *

UNITED STATES PATENT AND TRADEMARK OFFICE
CERTIFICATE OF CORRECTION

PATENT NO.  : 5,422,422
DATED       : June 6, 1995
INVENTOR(S) : Martina BADER, ET AL.

It is certified that error appears in the above-indentified patent and that said Letters Patent is hereby corrected as shown below:

On the title page; Item [54], and Column 1, Lines 2-4, the title should read:

--HIGH REFRACTIVE INDEX PLASTIC BASED ON AN ALKYLTHIOL AND AN ALKYLTHIOL ESTER--

Signed and Sealed this

Twenty-second Day of August, 1995

Attest:

BRUCE LEHMAN

*Attesting Officer*  *Commissioner of Patents and Trademarks*